Oct. 7, 1947.    W. A. PENNOW    2,428,580
SMOKE-GENERATING APPARATUS
Filed Sept. 27, 1944    3 Sheets-Sheet 1

WITNESSES:

INVENTOR
Willis A. Pennow
BY
ATTORNEY

Oct. 7, 1947. W. A. PENNOW 2,428,580
SMOKE-GENERATING APPARATUS
Filed Sept. 27, 1944 3 Sheets-Sheet 2
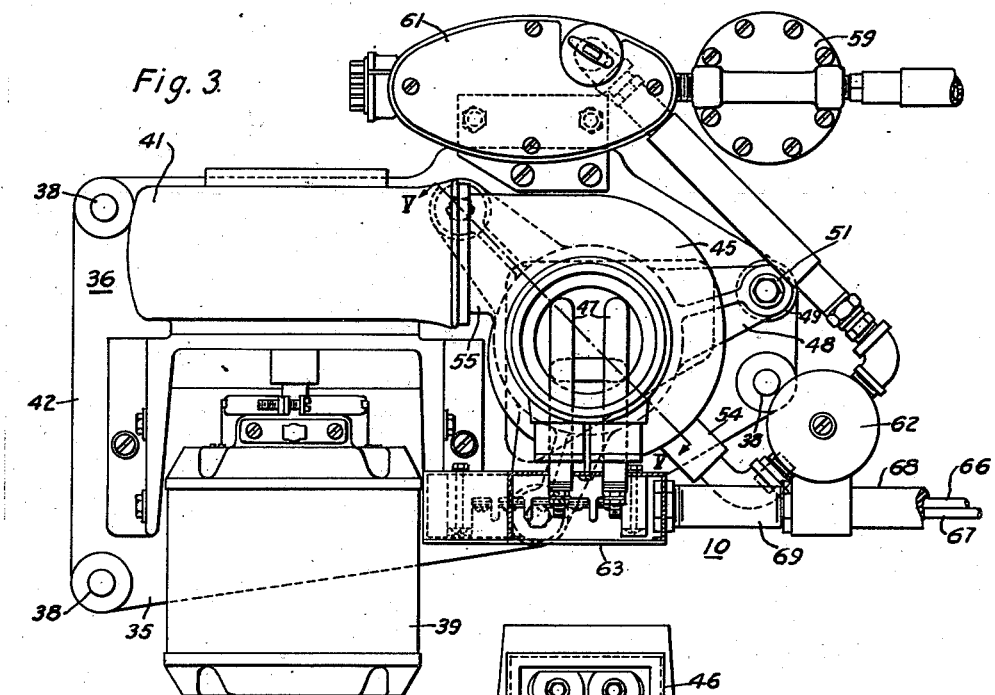
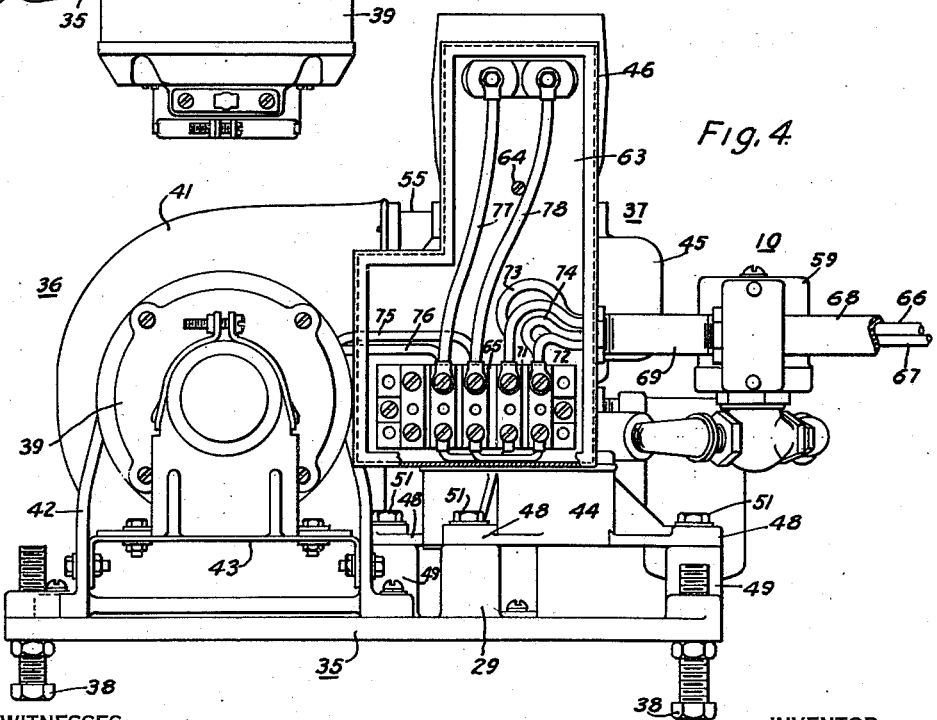
WITNESSES:
INVENTOR
Willis A. Pennow
BY
ATTORNEY Oct. 7, 1947.　　　W. A. PENNOW　　　2,428,580
SMOKE-GENERATING APPARATUS
Filed Sept. 27, 1944　　　3 Sheets-Sheet 3
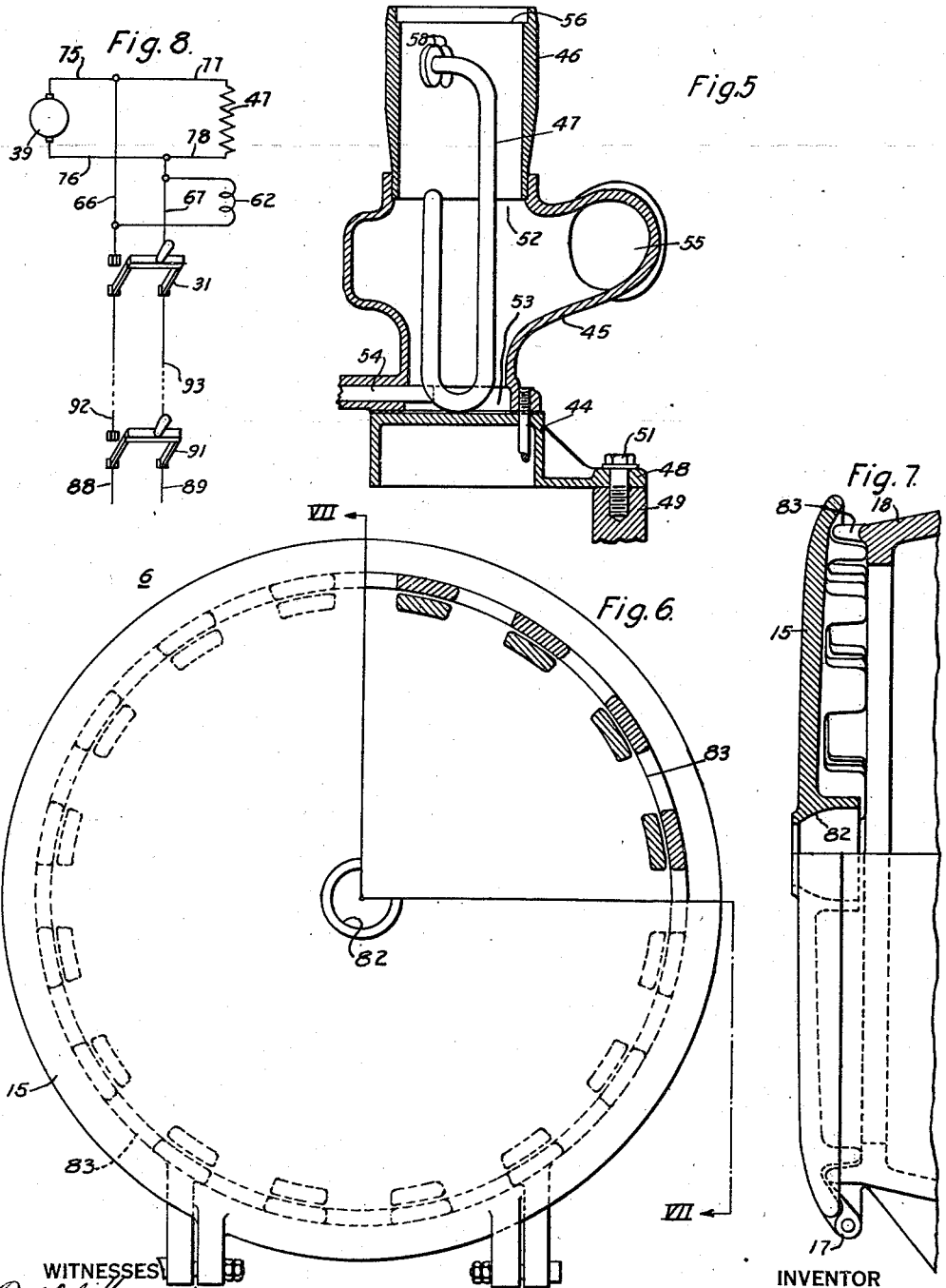
INVENTOR
Willis A. Pennow
BY
ATTORNEY Patented Oct. 7, 1947

2,428,580

UNITED STATES PATENT OFFICE 2,428,580

SMOKE-GENERATING APPARATUS

Willis A. Pennow, Cleveland, Ohio, assignor to Westinghouse Electric Corporation, East Pittsburgh, Pa., a corporation of Pennsylvania Application September 27, 1944, Serial No. 555,982

8 Claims. (Cl. 252—359)

My invention relates, generally, to indicators and, more particularly, to smoke-generating apparatus for indicating wind direction and/or condition at airports and the like.

Heretofore, it has been the usual practice to indicate wind direction at airports by means of such devices as wind T's and the like, which are in the nature of wind vanes and require a certain amount of force to effect their movement. Such devices, being of a mechanical nature, have certain disadvantages in that they cannot be accurately observed at any great distance and do not accurately indicate wind direction or condition under gusty and oscillatory wind conditions.

Furthermore, devices of this type must be installed at the boundaries of the landing field or area and not near or on the runway, so that they do not always function to give a true indication of wind conditions over the runways. Thus, a false indication may be obtained by turbulence caused by buildings and other local conditions. In other words, devices of this general character have certain shortcomings due to their inherent construction and cannot be so constructed as to be sensitive enough to give accurate indications of wind condition and/or direction under all conditions.

Accordingly, it is an object of my invention, generally stated, to provide for positively and accurately indicating wind direction and/or condition without the use of a mechanical structure which must be actuated in some manner by the force of the wind, and by means which shall function under all wind conditions to give a reliable and accurate indication which is visible to the pilot of a plane from a comparatively long distance.

A more specific object of my invention is to provide for indicating wind direction and/or condition by means of a smoke plume which gives an indication under any and all operating conditions.

Another object of my invention is to provide smoke-generating apparatus for use in indicating wind direction which shall be of simple and economical construction, and which shall function in a reliable manner to produce the necessary quantity of a dense white smoke.

A further object of my invention is to provide smoke-generating apparatus wherein liquid fuel is continuously vaporized in a heater chamber, mixed with air and forced out of the heater chamber into the free air in the form of a dense white smoke.

Another object of my invention is to provide smoke-generating apparatus wherein a heater chamber having an electric immersion heater mounted therein is utilized to vaporize fuel oil contained therein, which is mixed with a large quantity of air forced into the heater chamber by a blower connected therewith and the mixture of air and vapor circulated about an unimmersed portion of the heater to produce a gas which upon being discharged from the heater chamber into the free air produces a dense white smoke.

A still further object of my invention is to provide, in a smoke generator of the character described, for separating unvaporized fuel oil from the vapor as it is discharged from the heater chamber and returning it to the heater chamber for revaporization.

A further object of my invention is to provide, in a smoke generator of the character described, for utilizing a chimney or stack member connected with the discharge opening of the heater chamber to function as a condenser to separate unvaporized oil particles from the vapor and return them to the heater chamber for revaporization.

Another object of my invention is to provide, in a smoke generator of the character described, for controlling the vapor discharged from the heater chamber by means of a Venturi chamber so as to obtain maximum cohesion of the smoke plume as it emerges into the free air to provide better indication of wind direction.

These and other objects of my invention will become more apparent from the following detailed description when read in conjunction with the drawings, in which:

Fig. 3 is a plan view of the heater assembly or burner of the apparatus shown in Figs. 1 and 2;

Fig. 4 is a side view in elevation of the heater assembly of Fig. 3;

Fig. 5 is a side view in elevation, partially in section, of the electric heater element, and also showing a portion of the heater chamber;

Fig. 6 is a plan view of the manhole cover for the vault as shown in Fig. 2, partially cut away to show the details of the structure;

Fig. 7 is a side view of the manhole cover of Fig. 6, taken along the lines VII—VII thereof; and Fig. 8 is a schematic diagram of the electrical circuit of the smoke-generating apparatus.

In practicing my invention in its preferred form, a heater assembly is mounted in an underground vault near the runways of a landing field and supplied with fuel oil from a suitable underground tank. The cover of the vault is installed substantially flush with the ground level and is provided with an opening or chimney hole connected to the heater assembly by a chimney pipe or stack. The heater assembly comprises a bedplate upon which is mounted a blower and a heater chamber. The heater chamber comprises a base for supporting a cup-shaped housing in which an electric immersion heater element is mounted so as to extend down into the fuel oil contained within the housing and maintained at a substantially constant level therein by means of a constant level oil control device connected in the fuel supply system. The fuel oil is fed into the heater chamber by gravity feed or otherwise, and the blower functions to blow large quantities of air into the chamber where the fuel oil is being vaporized by the heater element. The housing is provided with an outlet or discharge opening connected with the chimney hole in the manhole cover by means of the tubular chimney pipe or stack which functions as a condenser to separate unvaporized fuel from the vapor and return it to the housing for revaporization. The chimney hole in the cover is in the form of a Venturi chamber and cooperates with the upper end of the chimney pipe to effect proper mixing of the vaporized fuel and air obtained from the vault, and prevents breaking up of the gas or vapor column. The fuel supply system also comprises, in addition to the previously-mentioned oil control device, an oil filter and a magnetic cutoff valve which is electrically connected to automatically open and close the fuel line when the blower motor and heater are on and off, respectively. The smoke generator may be remotely controlled by means of a suitable control switch operable to close an energizing circuit for the blower motor and heater.

Figure 1:
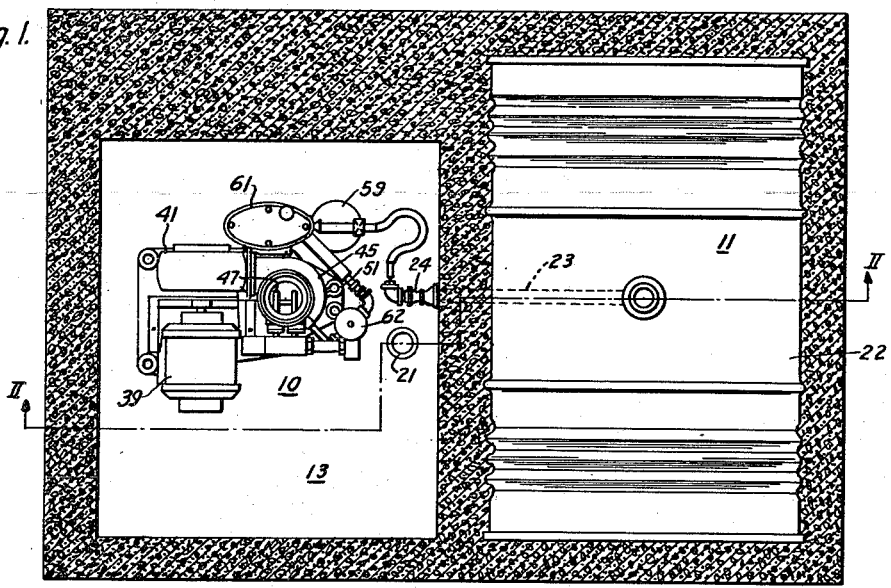
Figure 1 is a plan view, taken along the lines I—I of Fig. 2, showing smoke-generating apparatus embodying the principal features of my invention.
Figure 2:
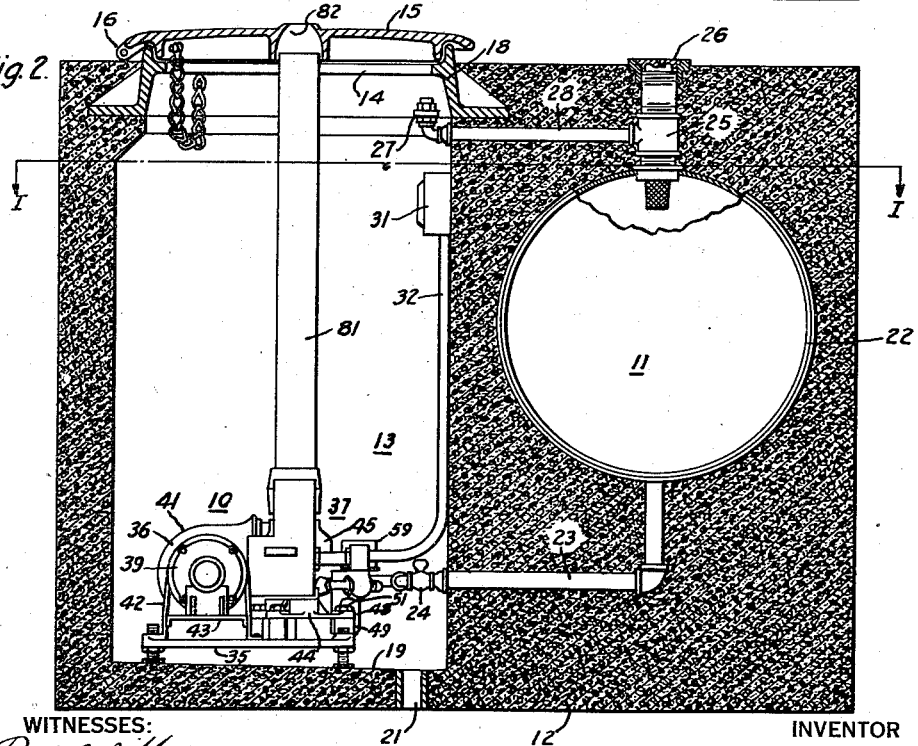
Fig. 2 is an elevation view, partly in section, taken along lines II—II of Fig. 1.

Referring now to Figures 1 and 2 of the drawing, there is shown one, and perhaps the preferred, embodiment of my invention. This is an underground or vault installation which makes it possible to locate the smoke-generating apparatus at a desired location, such as adjacent to or upon the runway or landing area of an airport or between two runways, where the smoke generated by the apparatus can be utilized to the greatest advantage in indicating wind direction and/or condition.

It is to be understood, however, that the smoke-generating unit or heater assembly of my invention is also susceptible of being utilized in other ways. For example, it may be mounted above ground level on a platform or other support at the edge of the field, or in any other suitable manner or location not requiring an underground or flush mounting, as shown in this particular example.

The smoke-generating apparatus shown in the drawing comprises, generally, a heater assembly 10 and a tank assembly 11 mounted in an underground vault constructed of concrete, the top of which is substantially at ground level. The heater assembly 10 is mounted on the bottom of the pit portion 13 of the vault which has a top opening 14 over which is mounted a hinged manhole cover 15, as shown best in Fig. 2. The cover 15 is attached by hinges 16 and 17 to a ring member 18 embedded in the concrete. As shown in Fig. 2, the pit portion 13 of the vault is provided with a sloping bottom 19, at the lower level of which is provided a drainage opening 21.

The tank element 22 of the tank assembly 11 and its associated piping are embedded in the concrete of the vault. In this instance, the tank 22 is mounted above the heater assembly 10 to provide a gravity feed of fuel oil to the heater assembly through the lead pipe 23 and cutoff valve 24 located within the pit 13. A filler pipe 25 extends from a top opening in the tank 22 to the top of the vault and is closed by means of a removable cap 26.

A vacuum breaker 27 is mounted within the pit 13 upon the end of a pipe 28 connecting with the filler pipe 25.

It will be readily understood that the gravity feed shown is the simplest and most economical method of feeding fuel oil to the heater assembly. It is to be understood, however, that the fuel oil may be fed to the heater assembly in any desired manner; for example, it might be pumped thereto from a greater distance or from a lower level or forced thereto by means of compressed air.

The heater assembly may be connected to a suitable source of current, not shown, through an entrance switch 31 connected to the heater assembly by a conduit 32. This switch may be mounted upon a wall of the pit, and the supply leads from the current source run thereto through an underground conduit extending through the wall of the vault at any desired point.

The heater assembly 10 comprises, generally, a bedplate 35, a blower 36, and a heater chamber 37. The bedplate 35, which supports all of the various parts of the assembly, is provided with a plurality of leveling screws 38 which function as adjustable feet to level the bedplate on the sloping floor 19 of the pit. The blower 36 is of the motor-operated type and comprises a motor 39 which drives a blower wheel, not shown, within a blower-wheel casing 41, a casing support bracket 42, and a motor base 43.

The heater chamber 37 comprises a heater base 44, a housing 45, a heater support 46, and a heater element 47. The heater base 44 is preferably made of a high-grade nickel-iron, which is corrosion-proof, non-magnetic, and heat-resistant to withstand the relatively high fuel temperature. As shown in Figs. 4 and 5, the heater base is shaped like an inverted cup and is provided with a plurality of horizontal foot portions 48 which rest upon mounting bosses 49 on the bedplate 35 and secured thereto by the stud bolts 51.

The heater housing 45 is torus-shaped and is preferably made of cast iron. As shown best in Fig. 5, it is provided with top and bottom openings 52 and 53, respectively, the top opening being machined to receive the heater support 46, and the bottom opening likewise being machined to provide an oil-tight fit with the upper surface of the base 44. The housing is also provided with a fuel intake orifice 54 at the bottom and a horizontal intake opening 55 which is connected to the outlet opening of the blower housing 41, as best shown in Fig. 3.

It will be apparent that the base 44 and housing 45 cooperate to form a sump or chamber to receive fuel oil from the supply tank for vaporization when subjected to heat by the heater element.

The heater support 46 is in the form of a ring machined at the bottom end to interfit with the opening 52 in the top of the heater chamber 45, and is also provided with a recess 56 at the top.

In this instance, the heater element 47 is of the tubular type, preferably formed of stainless steel tubing. As shown, the heater element is continuous from one terminal to another, but is so shaped as to provide a plurality, four, in this instance, of vertical heating elements extending from the base of the heater chamber up into the housing. The heater element 47 is supported from its two free ends by the entrance bushings 58 which extend through suitable openings in the heater support 46.

It will be readily understood that the use of a heater element of this particular form or shape makes it possible to locate the terminals thereof above the oil level in the heater chamber, and also provides for maximum utilization of the heater element in effecting the vaporization of the fuel oil.

It will be observed that the heater element extends to the bottom of the heater chamber so that the lower end thereof is immersed in the oil contained within the heater chamber and maintained at a predetermined constant level, and that there is an exposed portion of the heater element above the oil level which functions to raise the temperature of the vapor as it passes upwardly out of the heater chamber.

The fuel system of the heater assembly comprises an oil filter 59, a constant level oil control device 61, and a magnetic cutoff valve 62 together with the necessary connecting tubing. The oil filter 59 is of the usual type, and is provided with inlet and outlet openings for connection in the supply line.

The constant level oil control device 61 is utilized for controlling the flow of oil to the heater chamber and to automatically maintain a substantially constant oil level therein. Examples of devices of this type are well known in the art, and since this device per se is not a part of my invention, a detailed description thereof is deemed to be unnecessary.

The magnetic cutoff valve 62 is a solenoid-operated valve, and, in this instance, is electrically connected so as to be energized when the blower motor and heater are energized. In other words, this valve functions to automatically shut off the flow of fuel oil to the heater chamber in that the supply of electrical power to the apparatus is interrupted for any reason.

The heater assembly is provided with a connection box 63 mounted in an upright position alongside the heater chamber, as shown in Fig. 3. This box is connected to the heater chamber by means of a screw 64 extending through the back wall thereof, as shown. Within the connection box, there is mounted a terminal block 65 to which the various electrical connections are made. As shown, the supply conductors 66 and 67 extend through the conduit 68 connected to the cutoff valve 62 and through conduit 69 into the connection box where the terminals 71 and 72 thereof are connected, as shown. The cutoff valve 62 is energized through conductors 73 and 74 which extend back through the conduit 69. The motor 39 is connected to the supply conductors through leads 75 and 76, and the heater element is connected through leads 77 and 78.

In order to provide for conducting the vaporized fuel from the heater assembly to the outside atmosphere and to prevent any appreciable quantity of unvaporized fuel oil from being blown into the air, the heater assembly is connected to the manhole cover by means of a chimney pipe or stack 81, as shown in Fig. 2. The lower end of the stack 81 rests within the recess 56 at the top of the heater support 46, and the upper end of the stack extends to a point adjacent the outlet opening 82 in the cover 15. This outlet opening is in the form of a Venturi chamber into which the upper end of the stack extends in spaced relation to the side walls thereof.

The use of a relatively long stack provides a condenser for the fuel oil which is not fully vaporized so as to return it to the heater chamber for vaporization. The Venturi-chamber type of opening in the cover 15 has been utilized not only for the purpose of mixing air with the vapor or gas discharged, but also for the purpose of enabling the stack to function as a condenser in the most efficient manner. Since the upper end of the stack does not touch any metal part of the apparatus, a uniform reduction in stack temperature is insured with no hot or cold spots to interfere with proper condensation of the unvaporized fuel oil.

The Venturi opening or chamber also provides for the mixing of a large amount of air with the heater vapor or gas as it is discharged out of the upper end of the stack. The vapor passes upwardly through the stack with violent rotary motion, and the use of the Venturi chamber prevents breaking up of the column of vapor as it is discharged.

In view of the fact that a large quantity of air is mixed with the discharged vapor in the Venturi chamber, it is necessary to provide for the entrance of a large quantity of air into the pit 13, otherwise a vacuum condition would be established. This is accomplished by the particular construction of the manhole cover utilized, which is shown in Figs. 6 and 7.

As shown in Figs. 6 and 7, the internal flange portion of the cover and the external flange portion of the ring member to which it is connected are provided with a plurality of openings 83 spaced about the circumference thereof. These openings are provided by cutting away portions of the flanges, as shown in Fig. 7, and function to permit the entrance into the pit of a large quantity of air so that the air therein will be at atmospheric pressure at all times.

The electrical circuit arrangement of the smoke-generating apparatus is shown schematically in Fig. 8. This shows not only the electrical circuit at the vault, but also the manner in which the apparatus may be controlled from a remote point.

As shown, the source of current indicated by conductors 88 and 89 is connected through a control switch 91 to conductors 92 and 93, which extend to the vault through an underground conduit or other suitable means to the entrance switch 31 within the vault. Within the vault, the motor 39, heater 47, and the electrical element of the magnetic cutoff valve 62 are connected in parallel circuit relation, as shown. When the entrance switch 31 at the vault is closed, the apparatus may be controlled from the remote point by means of the control switch 91.

Having now described the detailed structural features of the apparatus, its principal operation will now be described. Assuming that the control valve 24 in the pit has been opened and that the constant level control device 61 has been properly adjusted, the closure of the control switch 91 at the remote location energizes the magnetic cutoff valve 62 as well as the motor 39 and heater 47. The control device 61 auto- matically functions to maintain the flow of fuel oil to the heater chamber at such a rate as to maintain a substantially constant level. The heater element 47 is so constructed as to develop a maximum temperature on the immersed portion that is below the flash point of the oil, but which raises the temperature of the oil to the boiling point and causes vaporization thereof.

The blower 41 functions to mix a large quantity of air with the vapor as it leaves the surface of the liquid fuel and passes upwardly through the top opening of the heater chamber into the stack 81. In view of the fact that the upper portion of the heater element is exposed, it functions to superheat the vapor as it passes upwardly and cause it to be changed to a gas.

It will be readily understood that even though the oil is vaporized at a high temperature and the vapor is superheated, ignition of the vapor is prevented by the great amount of dilution effected by the mixing of a large quantity of air with it as it is discharged upwardly through the stack.

It has been explained hereinbefore how the stack 81 functions as a condenser to return unvaporized fuel to the heater chamber and how the Venturi chamber 82 at the top of the stack functions to mix a large quantity of air from the pit with the gas as it is discharged into the atmosphere. While it is possible to operate this apparatus without the use of the stack 81 or the Venturi chamber 82, the use of these devices provides a better and more efficient generator. Unless some means is provided for condensing the oil particles in the vapor as it is discharged from the heater chamber, these oil particles will be discharged into the atmosphere with the result that the surrounding area is covered with oil. Unless the Venturi chamber is used, the gas column which is discharged from the upper end of the stack has a tendency to break up so that the smoke plume produced thereby does not have the necessary cohesion to provide the best indication of wind direction.

The fuel oil suitable for use in the smoke-generating apparatus of my invention is similar to that used in compression ignition type Diesel engines and should have a low viscosity, a high flash point, and a low carbon and asphaltine content.

As an example, the specification for an oil which has been found to be highly satisfactory is as follows:

| | |
|---|---|
| A. P. I. gravity | 38 |
| Specific gravity | 0.835 |
| Flash (PM) ° F. | 210/215 |
| Viscosity, S. U. V. at 100° F. | 39 |
| Conradson carbon content per cent max. | 0.05 |
| Ash | Nil |
| Hard asphalt | Nil |
| Pour ° F. | 25/30 |

*Distillation*

| | ° F. |
|---|---|
| I. B. P. | 415 |
| F. B. P., approx. 98.5% | 680 |

It will be apparent that the construction of my heater assembly makes it possible to easily clean the heater chamber and heater element. Since the heater element is supported by the ring member 46 which rests upon the housing 45, it may be readily removed as a unit by disconnecting the leads 77 and 78 from the terminals and lifting the entire heater unit from the heater chamber after the connection box 63 has been removed or tilted outwardly so as to permit the terminals of the heater element to be moved upwardly. Any carbon deposit on the heater coil may be readily removed, while any sludge formed within the bottom of the heater chamber may also be removed without disassembling the housing thereof from the rest of the elements.

In view of the foregoing description of my smoke-generating apparatus, it will be apparent that I have provided apparatus of this nature which is of simple design and which will function to effectively produce a smoke plume in a continuous manner over relatively long periods of time. Furthermore, the apparatus is of such nature that it may be readily controlled from a remote point and located at a point with respect to the runways or landing area of an airfield to operate to the greatest advantage. The mechanical structure of the heater assembly is such that it may be readily serviced and maintained without shutting down the apparatus for any extended period of time.

While I have described a specific embodiment of my invention, it is to be understood that changes and modifications may be made therein without departing from the principles of the invention.

I claim as my invention:

1. Smoke-generating apparatus comprising, a heater chamber having a discharge opening and adapted to contain liquid fuel supplied thereto from a fuel supply source, a control device operable to maintain the liquid fuel in the heater chamber at a substantially constant predetermined level, an electric immersion heater element mounted within the heater chamber to vaporize the fuel, and a blower connected to the heater chamber above the fuel level for blowing air into said chamber in the area above the surface of the liquid fuel to be mixed with the vapor and forcing said mixture of air and vapor out of the heater chamber through the discharge opening into the atmosphere.

2. Smoke-generating apparatus comprising, a heater chamber adapted to contain fuel oil supplied thereto from a fuel supply source, said heater chamber including a base portion and a torus-shaped housing mounted thereon, said housing having a fuel intake orifice at the bottom, a discharge opening at the top, and an air intake opening adjacent the top opening, an electric immersion heater element mounted upon the housing and extending downwardly therein through the outlet opening to be partially immersed in the fuel oil contained in the housing, a control device connected to the fuel intake orifice operable to maintain a substantially constant fuel level within the housing below the air intake opening, and a blower connected with the air intake opening in the housing for blowing air into the heater chamber directly above the surface of the fuel oil and forcing a mixture of air and vaporized fuel oil out of the heater chamber through the discharge opening.

3. Smoke-generating apparatus comprising, a heater chamber adapted to contain fuel oil supplied thereto from a fuel oil supply source, said heater chamber including a base portion and a torus-shaped housing mounted thereon to provide a chamber for the fuel oil, said housing having a top discharge opening, a fuel intake orifice at the bottom and an air inlet opening intermediate the top and bottom, an electric immersion heater mounted upon the top of the housing, said heater including a tubular heater element and ring-shaped support adapted to seat over the top opening of the housing to support the heater element within the housing with its lower end adjacent the bottom thereof, a control device connected with the intake orifice in the bottom of the housing operable to maintain a substantially constant oil level in the chamber below the air intake opening, and a blower connected with the air intake opening in the housing for blowing air into the housing in the area above the surface level of the fuel oil and discharging a mixture of air and vaporized fuel oil out of the top discharge opening of the heater chamber into the atmosphere.

4. Smoke-generating apparatus for indicating wind direction comprising, a heater chamber adapted to contain liquid fuel supplied thereto from a fuel supply source, a fuel supply system connected to the chamber including a control device operable to maintain the fuel in the chamber at a substantially constant level, an electric immersion heater element mounted in the chamber, said heater element extending downwardly into the chamber below the fuel level and functioning when energized to vaporize the fuel, said heater chamber having a discharge opening above the fuel level, a chimney communicating with said discharge opening, and a blower connected to the heater chamber above the fuel level for blowing air into said chamber and forcing a mixture of air and vaporized fuel through the chimney into the free air, said chimney functioning as a condenser to return unvaporized fuel to the heater chamber.

5. Smoke-generating apparatus for use at airports for indicating wind direction comprising, an underground vault having a cover with a discharge opening therein, a heater assembly mounted in the vault, said heater assembly including a heater chamber and an electric immersion heater therein operable to produce a quantity of gas or vapor from liquid fuel supplied to the chamber from a source of fuel supply and maintained at a predetermined normal level therein and having an outlet opening at the top thereof, a blower connected to discharge into the chamber above the oil level and a chimney extending from the outlet opening of the heater assembly to the discharge opening in the cover of the vault, said chimney functioning as a condenser to return unvaporized particles of fuel to the heater chamber.

6. A smoke generator comprising, a container provided with a top opening, a cover for the top opening, said cover having an outlet opening therein, a heater assembly mounted in the container, said heater assembly including a chamber for containing fuel oil at a predetermined normal level supplied from a fuel supply source and an electric immersion heater element mounted in the chamber for vaporizing the fuel oil, said chamber having an outlet opening, a tubular chimney member extending from the outlet opening of the chamber to the outlet opening in the cover with its outlet end disposed in spaced relation with the edges of the outlet opening in the cover, and a blower connected to discharge into the chamber above the position of the normal fuel oil level for blowing air therein and forcing a mixture of air and vaporized fuel oil out through the chimney member into the atmosphere.

7. A smoke generator comprising, an underground vault having a top opening with a cover, said cover having a Venturi-shaped outlet chamber, a heater assembly including a heater chamber and an electric immersion heater mounted within the vault operable to vaporize fuel oil fed thereto from a fuel oil supply source and maintained at a predetermined normal level, said heater assembly having a discharge opening at the top thereof, and an air inlet opening intermediate the top and bottom above the position of normal fuel level a tubular chimney connecting the discharge opening of the heater assembly with the outlet chamber in the cover, the upper end of said chimney member being disposed in spaced relation with the internal walls of the Venturi chamber, thereby to provide for mixing air from the vault with the discharged vapor, and a blower connected to the air inlet opening of the heater chamber for blowing air therein to force the vaporized fuel oil out of the chamber into the atmosphere through the tubular chimney and the Venturi chamber.

8. A smoke generator comprising, an underground pit having a top opening provided with a cover member, said cover member having an outlet opening therein, an electrical heater assembly mounted in the pit operable to continuously vaporize fuel oil fed thereto from a supply source, said heater assembly including a fuel chamber with an outlet opening at the top thereof and an immersion heater mounted in the chamber, a chimney connecting said outlet opening in the chamber with the outlet opening in the cover member, a fuel supply system for the heater assembly including a control device operable to maintain a substantially constant oil level in the fuel chamber, and a blower connected to discharge air into the fuel chamber above the oil level.

WILLIS A. PENNOW.

REFERENCES CITED

The following references are of record in the file of this patent:

UNITED STATES PATENTS

| Number | Name | Date |
|---|---|---|
| 2,070,038 | Batt | Feb. 9, 1937 |
| 2,254,680 | Harvey | Sept. 2, 1941 |
| 1,526,570 | Smith | Feb. 17, 1925 |
| 2,048,997 | Collins | July 28, 1936 |
| 1,911,468 | Robinson | May 30, 1933 |
| 1,939,921 | Robinson | Dec. 19, 1933 |
| 2,324,359 | Callen | July 13, 1943 |